April 26, 1966 J. P. STADELMANN 3,247,729
GEAR ARRANGEMENT
Filed April 6, 1964
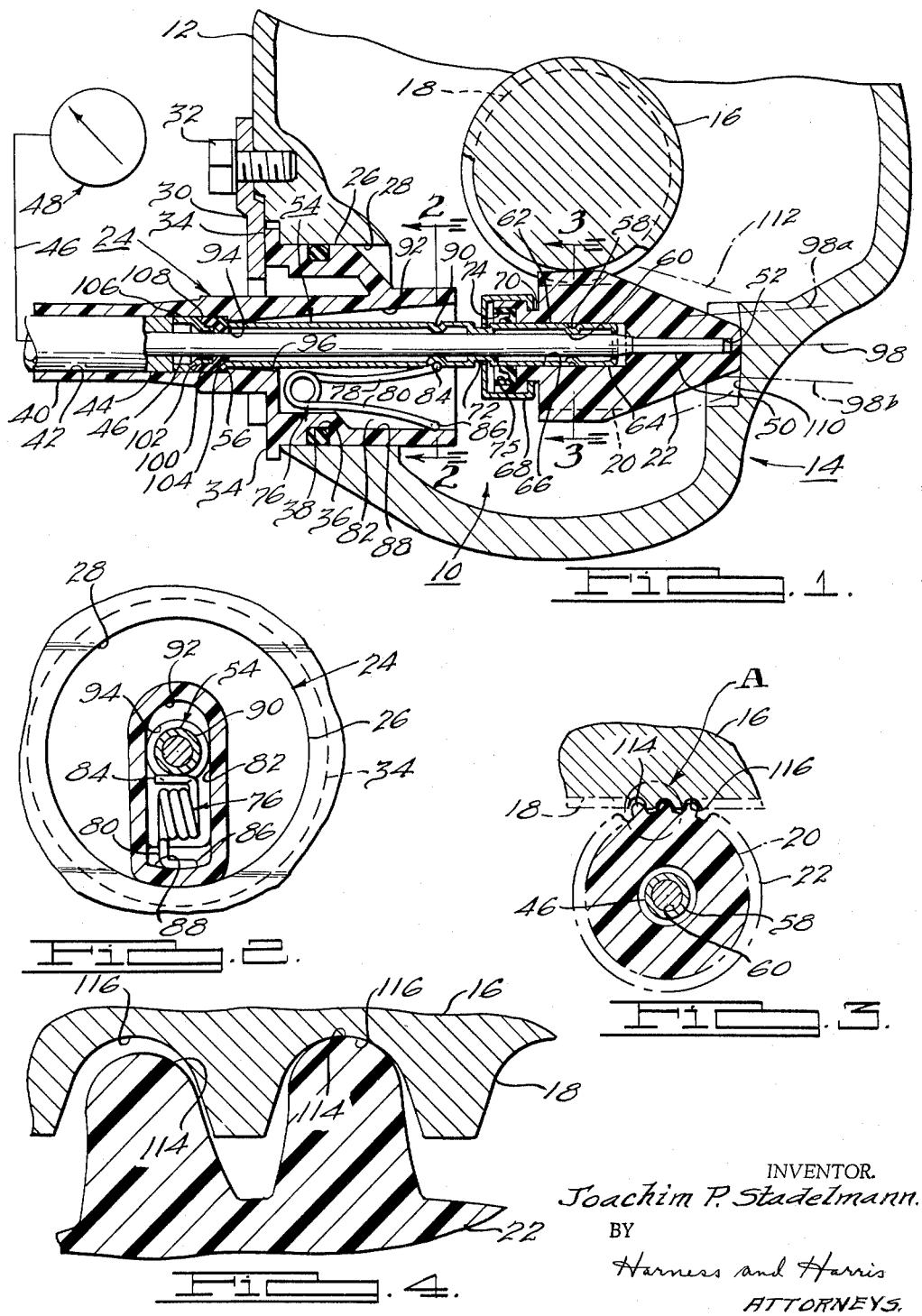
INVENTOR.
Joachim P. Stadelmann.
BY
Harness and Harris
ATTORNEYS.

United States Patent Office
3,247,729
Patented Apr. 26, 1966

3,247,729
GEAR ARRANGEMENT
Joachim P. Stadelmann, Madison Heights, Mich., assignor to Chrysler Corporation, Highland Park, Mich., a corporation of Delaware
Filed Apr. 6, 1964, Ser. No. 357,420
11 Claims. (Cl. 74—12)

This invention relates generally to a novel gear arrangement and more particularly to such a gear arrangement for driving a speedometer, odometer or a combination speedometer-odometer.

Presently, it is accepted practice in the automotive industry, with regard to mechanically driven speedometers, to drive (rotate) a speedometer cable by means of a pinion gear, operatively connected to one end of such cable, which is meshed with a worm thread formed on the vehicle transmission output shaft. In such arrangements the speedometer cable must experience a predetermined number of revolutions for each mile of vehicle travel in order to drive the speedometer and/or odometer, as the case may be, at a rate which is an accurate reflection of vehicle operation. This objective has not been readily attainable and, in some instances, it has been found to be practically impossible of achievement even when only one brand of automotive vehicle is considered. This will become evident when the following is considered.

Generally, every vehicle of at least one particular brand will have the same diameter of transmission output shaft and the same worm thread formed thereon. However, such vehicles may vary from each other with respect to axle ratio and/or tire size. It, of course, is evident that when tire size increases or the axle ratio decreases the number of revolutions of the transmission output shaft, for the same distance of vehicle travel, decreases. Further, such vehicles may have any one of a number of axle ratios as well as any one of a number of tire sizes. It is apparent that the number of revolutions, per mile of vehicle travel, which the output shaft will experience is then dependent on the particular combination of axle ratio and tire size selected for that particular vehicle.

The prior art has attempted to solve this problem by producing a variety of speedometer drive pinions, ranging, for example, from a fifteen tooth pinion to a twenty-one tooth pinion, and selectively employing such drive pinions on the basis of the number of teeth on the pinion, the particular axle ratio and tire size of the vehicle. This approach, even though presently commonly employed, does not always result in speedometer cable rotation which is a completely accurate indication of the distance traveled by the vehicle because the range of pinion gears possible, that is, from the pinion of least number of teeth to the pinion of greatest number of teeth, is limited in the prior art by the fixed center distance of the pinion gear shaft and the transmission output shaft. That is, the outer diameter of the pinion gear is limited and determined by said fixed center distance and predetermined diameter of the transmission output shaft.

Consequently, the only way that more teeth can be added to such a pinion gear with a fixed diameter and operating on a fixed center distance is to vary the thickness of the teeth on the pinion gear by increasing the gear pitch diameter while maintaining the same circular pitch. It should be obvious that this approach to a solution of the problem is immediately limited by other practical considerations. That is, by increasing the pitch diameter while maintaining the circular pitch, in order to accommodate the worm thread, the pinion teeth, of necessity, must become thinner. The pinion teeth must, of course, have a predetermined minimal thickness in order to withstand the forces applied thereagainst during normal operation.

Accordingly, for the above and other related reasons, the prior art has not been able to produce pinion gears of sufficient teeth to accommodate the range of requirements presented in automotive vehicle speedometer drive systems.

It is therefore an object of this invention to provide a novel and improved gear arrangement which has the ability to accommodate a large range of gear ratios without the necessity of varying the tooth thickness of the gears.

Another object of this invention is to provide a novel and improved speedometer drive arrangement employing means for providing the desired rotation of the speedometer drive cable regardless of the vehicle axle ratio or tire size.

Other objects and advantages of this invention will become apparent when reference is made to the following description and accompanying drawings wherein:

FIGURE 1 is a generally transverse cross-sectional view of a portion of an automotive transmission illustrating in longitudinal cross section a speedometer cable drive gear arrangement in combination therewith and constructed in accordance with the teachings of this invention;

FIGURE 2 is a cross-sectional view taken substantially on the plane of line 2—2 of FIGURE 1 and looking in the direction of the arrows;

FIGURE 3 is a cross-sectional view taken generally on the plane of line 3—3 of FIGURE 1 and looking in the direction of the arrows; and FIGURE 4 is an enlarged view of the portion indicated generally within circle A of FIGURE 3.

Referring now in greater detail to the drawings, FIGURE 1 illustrates a spring-loaded speedometer drive pinion gear assembly 10 received generally within casing 12 of a vehicle transmission 14 having an output shaft 16. A worm thread 18 formed on shaft 16 engages teeth 20 of pinion gear 22.

The speedometer drive pinion gear assembly 10 is further comprised of a body member 24 having a cylindrical outer portion 26 closely received within a bore 28 of transmission casing 12. A bifurcated clamp 30, secured to casing 12 as by a screw 32, serves to maintain body 24 in the position illustrated by abutting against a general flange portion 34 while an annular seal 36 received within a peripheral groove 38 prevents leakage therebetween.

The outer end of body 24 is provided with a generally tubular extension 40 which has a cylindrical recess or passageway 42 formed therein for the reception of a speedometer cable assembly comprised of a speedometer cable housing 44 and a cable core 46 having one end operatively connected to a suitable meter as a speedometer illustrated at 48 and another end 50 (preferably of square cross-section) received within a mating recess 52 of gear 22. Body 24 is preferably formed of a plastic material which serves to insulate and absorb a great portion of the noise which could otherwise be transmitted by a metallic body 24.

A tubular member 54, which receives cable core 46 therethrough, is itself received within housing 24 and generally retained within recess 42 by means of a conically flared end portion 56. An annular indentation 58 causes an annular ridge-like portion 60 formed internally of tubular member 54. The annular ridge 60 serves to at least partially center cable core 46 within tubular member 54.

During operation, pinion gear 22 and cable core 46 are rotated while tubular member or sleeve 54 remains stationary. Accordingly, the outer diameter 62 near the outer end 64 of sleeve 54 serves as the bearing surface against which the internal diameter 66 of gear 22 rotates during normal operation. Preferably, a retainer clip 68 cooperates with an annular groove 70, formed in gear 22, and an annular groove or indentation 72 formed in the outer diameter of sleeve 54, for limiting axial movement of gear 22 with respect to sleeve 54. An annular seal 74 is provided within a counterbore 75 so as to preclude or at least substantially minimize the passage of transmission lubricant between gear 22 and sleeve 54.

A coiled spring 76 having extended arms 78 and 80 is received within recess 82 of housing 24, as illustrated generally in FIGURES 1 and 2, in order to urge sleeve 54 upwardly and gear 22 upwardly against the transmission output shaft 16. Laterally directed abutment portions 84 and 86 of arms 78 and 80 respectively engage lower surface 88 of recess 82 and an annular indentation or groove 90 of sleeve 54. The bifurcated clamp 30 maintains body 24 in a position so that the spaced planar walls of recess 82 provide guide means which permit movement of tubular member 54 in a plane substantially perpendicular to the axis of output shaft 16.

The upper surface 92 of recess 82 is of generally arcuate cross-section and flaring upwardly from an aperture 94 which closely approximates the outer diameter of sleeve 54. A surface 96 of similar arcuate cross section flares downwardly from said aperture 94. Flared surfaces 92 and 96 enable sleeve 54, core 46 and gear 22 to be at times rotated generally about end 56 of sleeve 54 so as to cause the centerline 98 thereof to assume positions as, for example, indicated at 98a and 98b. The extreme positions as indicated by 98a and 98b are, of course, respectively determined by the arcuate and flared surfaces 92 and 96 which, in such instances, act as abutment means for the sleeve 54. A generally tubular seal 100 is wedged within recess 42 and held axially against flared end 56 of sleeve 54, by means of an annular retainer 106 provided with a conical surface 108, thereby forcing its ends 102 and 104 to conform to end 56 and 106 thereby assuming a generally conical configuration. Seal 100, retained in the manner described, is sufficiently resilient to provide adequate sealing even though the sleeve 54 and gear 22 be raised or lowered to positions indicated at 98a and 98b. Preferably a spherical surface 110 is provided within transmission housing 12 which is adapted to at least at times engage the axial outer end of the pinion gear thereby functioning to absorb axial thrust forces experienced by gear 22.

The basic operation of the invention should, of course, be apparent. That is, as transmission output shaft 16 rotates, worm thread 18 engages teeth 20 thereby driving gear 22, and speedometer 48 by means of the speedometer cable core 46 and core tang 50.

As previously stated, the problem encountered by the prior art was to get the proper number of teeth on the pinion gear relative to the transmission output shaft worm thread so as to produce an accurate reading on the speedometer. The invention as disclosed provides an arrangement which not only accommodates pinion gears of varying numbers of teeth, but also accommodates pinion gears of varying diameters. For example, a pinion gear of smallest diameter, when mounted on sleeve 54 and urged into engagement with output shaft 16 by spring 86, could assume a position wherein its centerline would be coincident with centerline 98a and its outer surface at 112, whereas a pinion gear of largest diameter, when engaged with output shaft 16, could have its centerline coincident with centerline 98b.

The fact that pinion gears of varying diameters can be employed serves to further increase the range of pinion gears which can be employed for driving the speedometer cable. That is, assuming that pinions of five different diameters are employed and that each of the diameters is capable of providing a range of pinions comprised of six different numbers of teeth, then thirty distinctly different pinions could be provided, which would mean, a range of drive pinion gears wherein the pinion of greatest number of teeth has twenty-nine teeth more than the pinion of least number of teeth. It can be appreciated that with such a large range that the percentage of change in the speed of rotation of the speedometer cable, due to the change by one tooth in a pinion gear, would be very slight.

Another important feature of this invention is the provision of a worm thread and pinion gear teeth of a profile which permits the tip of the pinion gear tooth to roll in the root of the worm thread as illustrated, for example in FIGURES 3 and 4.

Referring to FIGURES 3 and 4, it can be seen that the tip curve 114 of the teeth 20 comprising the gear 22 is held in engagement with the fillet radius 116 of the worm thread 18 of shaft 16. In such an arrangement, unlike the prior art, substantially the entire engagement pressure between the worm thread and pinion gear teeth is brought to bear on the full fillet radius 116 and the generally mating pinion gear tooth tip curve 114. By providing such a profile and thereby enabling pressure engaged gearing it becomes possible to have a greater range of teeth for any one particular pinion gear diameter as compared to the prior art system of requiring pitch diameter engagement of the meshing gears. Any tendency to wear as between the fillet radius 116 and tooth tip 114 of course quickly diminishes because even a slight amount of wear on either surface increases the area of contact therebetween and thereby reduced the pressure loading.

Although only one preferred form of the invention has been disclosed and described, it is apparent that other embodiments and modifications of the invention are possible within the scope of the appended claims.

I claim:
1. An arrangement for driving a speedometer cable in accordance with indicia of vehicle operation comprising a vehicle transmission including a transmission casing and a transmission output shaft, a worm thread formed on said output shaft, an aperture formed through said transmission casing, a pinion gear mounting assembly received through said aperture, said assembly comprising a housing having an annular groove formed in the periphery thereof, a sealing member received within said groove sealingly engaging the surface defining said aperture, a cylindrical recess formed in one end of said housing, a generally vertically disposed slot-like opening formed in another end of said housing opposite to said one end and communicating with said cylindrical recess, said housing being positioned within said aperture so as to cause said slot-like opening to be disposed generally within the interior of said transmission casing while said cylindrical recess is directed generally outwardly of said transmission casing, clamping means secured to said casing externally thereof for maintaining said housing in a position wherein said slot-like opening is maintained in a generally vertical position, a tubular member received through said slot-like opening having one end retained generally within said cylindrical recess in a manner permitting relative angular motion therebetween and having another end projecting inwardly into the interior of said transmission casing, a pinion gear mounted on said other end of said tubular member for rotation thereabout, a speedometer, a speedometer drive cable assembly comprised of an outer flexible shroud and an inner flexible motion transmitting core, one end of said cable assembly being operatively connected to said speedometer, another end of said shroud being received and retained within said cylindrical recess, another end of said core extending through said other end of said shroud and through said other end of said tubular member engaging in driving relationship a mating opening formed in said pinion gear, and a coiled spring member received within said slot-like opening and having elongated arm portions engaging a lower portion of said slot-like opening and said tubular member where- by said tubular member and said pinion gear are urged upwardly, by having said tubular member experience said relative angular motion, so as to have said pinion gear and said worm thread in meshed engagement with each other.

2. An arrangement for driving a speedometer cable in accordance with indicia of vehicle operation comprising a vehicle transmission including a transmission casing and a transmission output shaft, a gear engaging portion formed on said output shaft, an aperture formed through said transmission casing, a pinion gear mounting assembly received through said aperture, said assembly comprising a housing, a recess formed in one end of said housing, a generally vertically disposed slot-like opening formed in another end of said housing opposite to said one end and communicating with said recess, said housing being positioned within said aperture so as to cause said slot-like opening to be disposed generally within the interior of said transmission casing while said cylindrical recess is directed generally outwardly of said transmission casing, a tubular member received through said slot-like opening having one end retained generally within said recess and having another end projecting inwardly into the interior of said transmission casing, a pinion gear mounted on said other end of said tubular member for rotation thereabout, a speedometer drive cable assembly comprised of an outer flexible shroud and an inner flexible motion transmitting core, one end of said cable assembly being adapted to be operatively connected to an associated speedometer, another end of said shroud being received and retained within said recess, another end of said core extending through said other end of said shroud and through said other end of said tubular member, said other end of said core being received by said pinion gear so as to be in driving relationship therewith, and resilient means received within said slot-like opening urging said tubular member and said pinion gear upwardly so as to have said pinion gear and said gear engaging portion in meshed engagement with each other.

3. An arrangement for driving a speedometer cable in accordance with indicia of vehicle operation comprising a vehicle transmission including a transmission casing and a transmission output shaft, a gear engaging portion formed on said output shaft, an aperture formed through said transmission casing, a pinion gear mounting assembly received through said aperture, said assembly comprising a housing, a recess formed in one end of said housing, a generally vertically disposed slot-like opening formed in another end of said housing opposite to said one end and communicating with said recess, said housing being positioned within said aperture so as to cause said slot-like opening to be disposed generally within the interior of said transmission casing while said recess is directed generally outwardly of said transmission casing, clamping means secured to said casing externally thereof for maintaining said housing in a position wherein said slot-like opening is maintained in a generally vertical position, a tubular member received through said slot-like opening having one end retained generally within said recess in a manner permitting relative angular motion therebetween and having another end projecting inwardly into the interior of said transmission casing, a pinion gear mounted on said other end of said tubular member for rotation thereabout, a speedometer, a speedometer drive cable assembly comprised of an outer flexible shroud and an inner flexible motion transmitting core, one end of said cable assembly being operatively connected to said speedometer, another end of said shroud being received and retained within said recess, another end of said core extending through said other end of said shroud and through said other end of said tubular member engaging in driving relationship a mating opening formed in said pinion gear, and resilient means received within said slot-like opening engaging a lower portion of said slot-like opening and said tubular member whereby said tubular member and said pinion gear are urged upwardly, by having said tubular member experience said relative angular motion, so as to have said pinion gear and said gear engaging portion in meshed engagement with each other.

4. An arrangement for driving a speedometer cable in accordance with indicia of vehicle operation comprising a vehicle transmission including a transmission casing and a transmission output shaft, a gear engaging portion formed on said output shaft, an aperture formed through said transmission casing, a pinion gear mounting assembly received through said aperture, said assembly comprising a housing, a recess formed in one end of said housing, a generally vertically disposed slot-like opening formed in another end of said housing opposite to said one end and communicating with said recess, said housing being positioned within said aperture so as to cause said slot-like opening to be disposed generally within the interior of said transmission casing while said recess is directed generally outwardly of said transmission casing, a tubular member received through said slot-like opening having one end retained generally within said recess and having another end projecting inwardly into the interior of said transmission casing, a pinion gear mounted on said other end of said tubular member for rotation thereabout, a speedometer drive cable assembly comprised of an outer flexible shroud and an inner flexible motion transmitting core, one end of said cable assembly being adapted to be operatively connected to an associated speedometer, another end of said shroud being received and retained within said recess, another end of said core extending through said other end of said shroud and through said other end of said tubular member, said other end of said core being received by said pinion gear so as to be in driving relationship therewith, and resilient means received within said slot-like opening and engaging a lower portion of said slot-like opening and said tubular member whereby said tubular member and said pinion gear are urged upwardly so as to have said pinion gear and said gear engaging portion in meshed engagement with each other.

5. An arrangement for driving a speedometer cable in accordance with indicia of vehicle operation comprising a vehicle transmission including a transmission casing and a transmission output shaft, a worm thread formed on said output shaft, an aperture formed through said transmission casing, a pinion gear mounting assembly received through said aperture, said assembly comprising a housing having an annular groove formed in the periphery thereof, a first sealing member received within said groove sealingly engaging the surface defining said aperture, a cylindrical recess formed in one end of said housing, a generally vertically disposed slot-like opening formed in another end of said housing opposite to said one end and communicating with said cylindrical recess, said housing being positioned within said aperture so as to cause said slot-like opening to be disposed generally within the interior of said transmission casing while said cylindrical recess is directed generally outwardly of said transmission casing, clamping means secured to said casing externally thereof for maintaining said housing in a position wherein said slot-like opening is maintained in a generally vertical position, a tubular member received through said slot-like opening having one end retained generally within said cylindrical recess in a manner permitting relative angular motion therebetween and having another end projecting inwardly into the interior of said transmission casing, said one end of said tubular member being flared generally radially outwardly so as to abut against a shoulder portion of said recess, a pinion gear mounted on said other end of said tubular member for rotation thereabout, a speedometer, a speedometer drive cable assembly comprised of an outer flexible shroud and an inner flexible motion transmitting core, one end of said cable assembly being operatively connected to said speedometer, another end of said shroud being received and retained within said cylindrical recess, an annular seal received within said cylindrical recess between said flared end of said tubular member and said other end of said shroud, an annular retainer received within said cylindrical recess between said other end of said shroud and said annular seal forcing said seal into engagement with said flared end of said tubular member, another end of said core extending through said other end of said shroud and through said other end of said tubular member engaging in driving relationship a mating opening formed in said pinion gear, and a coiled spring member received within said slot-like opening and having elongated arm portions engaging a lower portion of said slot-like opening and said tubular member whereby said tubular member and said pinion gear are urged upwardly, by having said tubular member experience said relative angular motion, so as to have said pinion gear and said worm thread in meshed engagement with each other.

6. An arrangement for driving a speedometer cable in accordance with indicia of vehicle operation comprising a vehicle transmission including a transmission casing and a transmission output shaft, a worm thread formed on said output shaft, an aperture formed through said transmission casing, a pinion gear mounting assembly received through said aperture, said assembly comprising a plastic housing, a cylindrical recess formed in one end of said housing, a generally vertically disposed guide opening formed in another end of said housing opposite to said one end and communicating with said cylindrical recess, said housing being positioned within said aperture so as to cause said guide opening to be disposed generally within the interior of said transmission casing while said cylindrical recess is directed generally outwardly of said transmission casing, clamping means secured to said casing externally thereof for maintaining said housing in a position wherein said guide opening is maintained in a generally vertical position, a tubular member received through said guide opening and having one end retained generally within said cylindrical recess in a manner permitting relative angular motion therebetween in a generally vertical plane as determined by said guide opening, said tubular member having another end projecting inwardly into the interior of said transmission casing, a pinion gear mounted on said other end of said tubular member for rotation thereabout, a speedometer, a speedometer drive cable assembly comprised of an outer flexible shroud and an inner flexible motion transmitting core, one end of said cable assembly being operatively connected to said speedometer, another end of said shroud being received and retained within said cylindrical recess, another end of said core extending through said other end of said shroud and through said other end of said tubular member engaging in driving relationship a mating opening formed in said pinion gear, and a coiled spring member received within said guide opening and having elongated arm portions engaging a lower portion of said guide opening and said tubular member whereby said tubular member and said pinion gear are urged upwardly, by having said tubular member experience said relative angular motion, so as to have said pinion gear and said worm thread in meshed engagement with each other as by having the tips of the teeth of the pinion gear successively engage the root of the worm thread.

7. An arrangement for driving a speedometer cable in accordance with indicia of vehicle operation comprising a vehicle transmission including a transmission casing and a transmission output shaft, a worm thread formed on said output shaft, an aperture formed through said transmission casing, a pinion gear mounting assembly received through said aperture, said assembly comprising a housing having an annular groove formed in the periphery thereof, a sealing member received within said groove sealingly engaging the surface defining said aperture, a cylindrical recess formed in one end of said housing, a generally vertically disposed slot-like opening formed in another end of said housing opposite to said one end and communicating with said cylindrical recess, said housing being positioned within said aperture so as to cause said slot-like opening to be disposed generally within the interior of said transmission casing while said cylindrical recess is directed generally outwardly of said transmission casing, clamping means secured to said casing externally thereof for maintaining said housing in a position wherein said slot-like opening is maintained in a generally vertical position, a tubular member received through said slot-like opening having one end retained generally within said cylindrical recess in a manner permitting relative angular motion therebetween and having another end projecting inwardly into the interior of said transmission casing, a pinion gear mounted on said other end of said tubular member for rotation thereabout, a speedometer, a speedometer drive cable assembly comprised of an outer flexible shroud and an inner flexible motion transmitting core, one end of said cable assembly being operatively connected to said speedometer, another end of said shroud being received and retained within said cylindrical recess, another end of said core extending through said other end of said shroud and through said other end of said tubular member engaging in driving relationship a mating opening formed in said pinion gear, a second annular groove formed in said tubular member, a third annular groove formed in said tubular member and spaced axially from said second groove, a coiled spring member received within said slot-like opening and having elongated arm portions engaging a lower portion of said slot-like opening and said second groove of said tubular member whereby said tubular member and said pinion gear are urged upwardly, by having said tubular member experience said relative angular motion, so as to have said pinion gear and said worm thread in meshed engagement with each other, and clip means carried by said pinion gear and partly received by said third groove for limiting axial movement of said pinion gear relative to said tubular member.

8. A pinion gear mounting assembly adapted to compensate for required variations in the distance between the center of said pinion gear and another cooperating gear comprising a housing member adapted to be removably secured in a manner permitting of no relative motion thereof to a support common to said other gear, an elongated substantially inflexible journal member extending into said housing member and operatively secured at one end to said housing member in a manner permitting angular movement of said journal member relatively to said housing member, said journal member being adapted to carry externally thereof said pinion gear and to carry internally thereof motion transmitting means for operatively engaging said pinion gear, and resilient means effective to continually urge said journal member generally pivotally about said one end and in a planar path towards one extreme angular position with respect to said housing, said housing being so positioned as to result in said other gear being operatively engaged by said pinion gear as said journal member is being urged towards said extreme position.

9. A pinion gear mounting assembly adapted to compensate for required variations in the distance between the center of a pinion gear and another cooperating gear suitably retained in a supporting structure comprising a body, a passageway formed in said body, guide means provided in said body, a bearing member, a relatively flexible motion transmitting means extending through said passageway and through said bearing member so as to be in operative driving engagement with said pinion gear, said bearing member and said flexible motion transmitting means being restricted in movement by said guide means so that any displacement of said bearing member and said flexible motion transmitting means will occur within a path of movement which is generally within a plane which intersects the rotational axis of said other gear, and means continually tending to angularly displace said bearing member and said flexible motion transmitting means thereby causing said bearing member and said pinion gear to be urged in a direction which is within said path and towards said other gear so as to result in operative engagement between said pinion gear and said other gear.

10. A pinion gear mounting assembly adapted to compensate for required variations in the distance between the center of a pinion gear and another cooperating gear suitably retained in a supporting structure, comprising a body, a passageway formed in said body, guide means provided in said body, a bearing member, a relatively flexible motion transmitting means extending through said passageway and through said bearing member so as to be in operative driving engagement with said pinion gear, said bearing member and said flexible motion transmitting means being restricted in movement by said guide means so that any displacement of said bearing member and said flexible motion transmitting means will occur within a path of movement which is generally within a plane which intersects rotational axis of said other gear, resilient means continually tending to angularly displace said bearing member and said flexible motion transmitting means thereby causing said bearing member and said pinion gear to be urged in a direction which is within said path and towards said other gear so as to result in operative engagement between said pinion gear and said other gear, and abutment means carried by said body for presenting an absolute limit to the angular displacement as experienced by said bearing member and pinion gear as caused by said resilient means.

11. A pinion gear mounting assembly adapted to compensate for required variations in the distance between the center of said pinion gear and another cooperating gear suitably retained in a supporting structure comprising a body mounted so as to be relatively immovable with respect to said supporting structure, an opening formed through said body, guide means provided in said body, a tubular member having one end in said opening, said tubular member being formed to provide a bearing support for said pinion gear, relatively flexible motion transmitting means extending through said opening and through said tubular member so as to be in operative driving engagement with said pinion gear, said tubular member and said flexible motion transmitting means being restricted in movement by said guide means so that any displacement of said tubular member and said flexible motion transmitting means will occur within a path of movement which is generally within a plane which intersects the rotational axis of said gear, and resilient means carried by said body operatively engaging said tubular member so as to continually urge said tubublar member and said pinion gear in a generally arcuate path about said one end of said tubular member and within said plane so as to place said pinion gear in operative engagement with said other gear.

References Cited by the Examiner
UNITED STATES PATENTS

| | | | |
|---|---|---|---|
| 1,227,517 | 5/1917 | Yocum | 74—405 |
| 1,650,125 | 11/1927 | Gustafson | 74—12 |
| 1,720,648 | 7/1929 | Hallett | 74—458 |
| 1,726,421 | 8/1929 | Berge | 74—12 |
| 2,952,163 | 5/1960 | Kapeller | 74—458 X |

BROUGHTON G. DURHAM, *Primary Examiner.*

MILTON KAUFMAN, *Examiner.*